July 21, 1942.  G. W. WEBSTER  2,290,396

MOLDING VESSEL

Filed Jan. 17, 1941

Inventor
G.W. Webster

By

Attorneys

Patented July 21, 1942

2,290,396

UNITED STATES PATENT OFFICE 2,290,396

MOLDING VESSEL

George W. Webster, Milwaukee, Wis.

Application January 17, 1941, Serial No. 374,887

1 Claim. (Cl. 107—19)

My invention refers to culinary vessels or molds, and it has for its primary object to provide valve controlled vents formed in the bottom of the mold, whereby said mold is normally leakproof, but by manually releasing the valves, air is admitted between the bottom walls of said mold and the food product therein, whereby a film of air will free the molded product from adhesion to the vessel, and thus permit said molded product to be readily discharged from said vessel when the same is inverted.

This simple arrangement has been developed due to the fact that, in practice, molds of ordinary, closed bottom construction will cause the molded product to adhere thereto and render it difficult to free said molded product from said vessel walls without marring the surface of the product, which is desirable so that an unbroken and unmarred surface may be presented when the product is stripped from the mold and served at the table.

My invention, therefore, contemplates vent means whereby capillary adhesion is broken between the bottom of the vessel wall and said food product. Briefly, owing to the fact that the molded product and the bottom wall form a hermetical seal, this seal is broken by the admission of air under normal atmospheric pressure.

With the above and other objects in view, the invention consists in certain peculiarities of construction and arrangement of parts, as will be hereinafter fully set forth in connection with the accompanying drawing and subsequently claimed.

Figure 1:
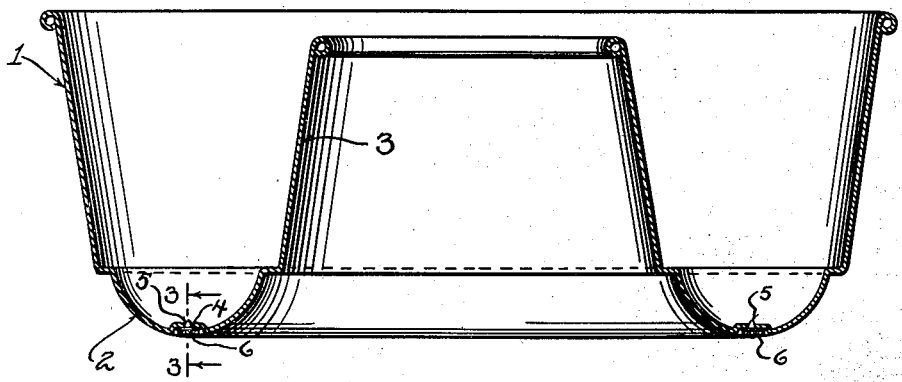
Figure 1 represents a sectional elevation of a molding vessel embodying the features of my invention.
Figure 2:
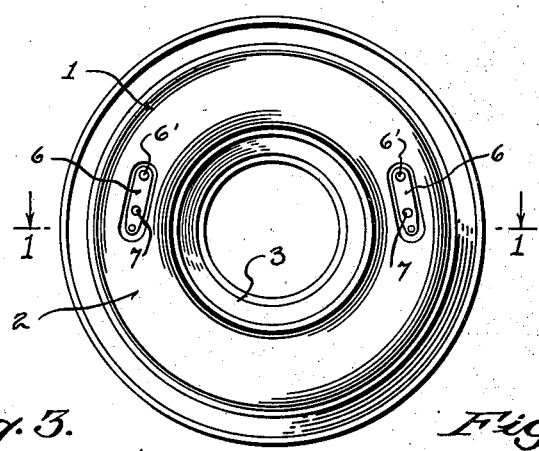
Figure 2 is an inverted plan view of the same upon a reduced scale.

Referring by characters to the drawing, the numeral 1 represents a mold or vessel, having a semi-rounded bottom 2 and a central horn 3, which, in conjunction with the outer walls of the vessel and bottom, constitute a ring mold for molding food products.

Figure 3:
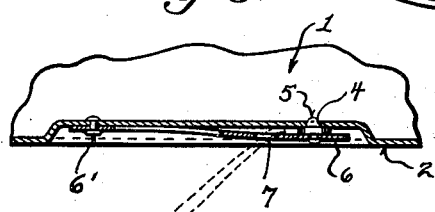
Figure 3 is a fragmentary, enlarged, sectional view of the bottom portion of the vessel, showing a spring controlled valve mechanism enclosing a vent in said bottom, the section being indicated by line 3—3 of Figure 1.
Figure 4:
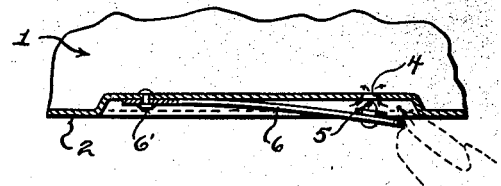
Figure 4 is a similar view of the valve mechanism showing the same in its open position with relation to the vent.

The bottom 2 is provided with oppositely disposed vent openings 4, which vent openings are normally closed by valve plugs 5. As best shown in Figures 3 and 4 of the drawing, the valve plugs are carried by the free ends of spring fingers 6, which fingers are riveted or otherwise secured at opposite ends to the vessel bottom.

The fingers 6 may also be provided with apertures 7 for convenience in opening the valve by any suitable, pointed tool.

As shown, it is understood that the spring fingers are preferably nested in the depression or seat formed in the bottom of the vessel, whereby said bottom is free from obstructions, and so arranged as to permit the same to rest flatly. Hence, as shown in Figures 3 and 4, the valves may either be opened by a tool or a finger of the operator, which may be inserted at the ends of the spring fingers 6, whereby air is admitted to the line of adhesion between the molded product and the vessel bottom.

While I have shown two valve-controlled vents, it is manifest that one or a number of said vents may be used, bearing in mind that the points of ventilation to permit air are spaced a sufficient distance apart to insure the rush of air throughout the circumference of the rounded radial bottom, so as to free the molded product from the bottom at all points.

Figure 5:
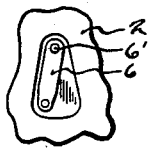
Figure 5 is a fragmentary, bottom plan view of another form of a valve mechanism.
Figure 6:
Figure 6 is a similar view, showing the valve mechanism shifted upon its pivot to expose the vent.
Figure 6:

Referring to Figures 5 and 6 of the drawing, I have shown another form of valve arrangement, whereby the spring fingers are pivoted upon rivets 6', and said fingers are shifted to open and closed position with relation to the vent 4. In other words, the valve may be made in any desired form, as, for example, in a ring or any other suitable design.

From the foregoing description, it will be observed that the product to be molded is poured into the vessel in liquid form and allowed to properly congeal. When it is desired to strip said molded ring from the vessel, it is only necessary to snap the valves open, whereby air is admitted between the molded surface and vessel to positively separate the adhesion that occurs between said parts, thus freeing the ring or molded product, whereby it can be readily stripped from the mouth of the vessel when said vessel is inverted, and thus it can be seen that the molded product is served with an unbroken surface, which under ordinary conditions cannot be obtained.

It should also be understood that the mold can be made in various forms, either of the ring type or solid, and that the mold vessel may be provided with any design, without departing from the spirit of my invention.

I claim:

A culinary vessel for molded products, the same having a bottom provided with an intake air vent, an elongated depression in the bottom wall about the air vent and extending a predetermined distance therefrom, a leaf spring fitted in the depression and secured at one end thereof, at a distance from the vent, a valve element carried at the free end of the spring for closing the air vent, the valve element and spring being positioned upon the exterior wall of the depression, whereby the valve is protected, the exteriorly positioned spring being lifted whereby the vent is opened to permit a current of air to enter between the walls of the vessel and the product contained therein to thus free the product without marring its surface.

GEORGE W. WEBSTER.